United States Patent
O'Connor et al.

(10) Patent No.: US 12,511,360 B2
(45) Date of Patent: Dec. 30, 2025

(54) FACE BIOMETRIC RECOGNITION WITH ANTI-SPOOFING

(71) Applicant: Princeton Identity, Hamilton, NJ (US)

(72) Inventors: Kyle James O'Connor, Philadelphia, PA (US); Erik Myhrer, New Brunswick, NJ (US); David Alan Ackerman, Hopewell, NJ (US)

(73) Assignee: Princeton Identity, Hamilton, NJ (US)

( * ) Notice: Subject to any disclaimer, the term of this patent is extended or adjusted under 35 U.S.C. 154(b) by 347 days.

(21) Appl. No.: 18/297,126

(22) Filed: Apr. 7, 2023

(65) Prior Publication Data

US 2023/0350996 A1 Nov. 2, 2023

Related U.S. Application Data (60) Provisional application No. 63/335,252, filed on Apr. 27, 2022.

(51) Int. Cl.
*G06F 21/32* (2013.01)
*G06V 40/16* (2022.01)
(Continued)

(52) U.S. Cl.
CPC ............ *G06F 21/32* (2013.01); *G06V 40/165* (2022.01); *G06V 40/18* (2022.01); *G06V 40/45* (2022.01); *G06V 40/50* (2022.01)

(58) Field of Classification Search
CPC ...... G06F 21/32; G06V 40/165; G06V 40/18; G06V 40/45; G06V 40/50; G06V 40/172;
(Continued)

(56) References Cited

U.S. PATENT DOCUMENTS 9,594,969 B1 * 3/2017 Negi ..................... G06V 40/19
10,643,087 B2 * 5/2020 Green .................. G06V 40/45
(Continued)

FOREIGN PATENT DOCUMENTS

DE 102020123927 A1 * 3/2022 ........... G06V 20/597
EP 3933666 A1 * 1/2022 ............. G06F 3/013
(Continued)

OTHER PUBLICATIONS

Multispectral Face Spoofing Detection using VIS-NIR Imaging Correlation; Xudong Sun et al; International Journal of Wavelets, Multiresolution and Information Processing; vol. 16, No. 2 (2018); World Scientific Publishing Company. (Year: 2018).*
(Continued)

*Primary Examiner* — David Ometz
(74) *Attorney, Agent, or Firm* — Young Basile Hanlon & MacFarlane, P.C.

(57) ABSTRACT

Disclosed herein are methods, apparatus, and systems for face biometric recognition. A biometric recognition device includes at least one non-visible illuminator, at least one image capture device, and a processor. The at least one image capture device and the at least one non-visible illuminator are in a differential measurement configuration. The processor determines one or more eyes and a face from one or more captured images, performs liveness detection by comparing one or more pupil images from even-odd image pairs from the one or more captured images, wherein a non-noise color or brightness difference indicates pupil liveness, performs face encoding on the live face to generate face template, performs face matching on the face template to generate a face result, and uses one or more of the liveness result and the face result to enable the user to access an object.

13 Claims, 8 Drawing Sheets

(51) Int. Cl.
*G06V 40/18* (2022.01)
*G06V 40/40* (2022.01)
*G06V 40/50* (2022.01)

(58) Field of Classification Search
CPC .... G06V 10/14; G06V 10/143; G06V 10/751; G06V 40/19; G06V 40/197
See application file for complete search history.

(56) References Cited

U.S. PATENT DOCUMENTS

| | | | | |
|---|---|---|---|---|
| 10,691,939 | B2* | 6/2020 | Xue | G06V 40/193 |
| 11,195,009 | B1* | 12/2021 | Joshi | G06V 10/143 |
| 11,216,647 | B2* | 1/2022 | He | G06V 10/145 |
| 11,294,996 | B2* | 4/2022 | Rowe | G06F 21/32 |
| 11,948,402 | B2* | 4/2024 | Hirvonen | G06V 40/40 |
| 2007/0165244 | A1* | 7/2007 | Yukhin | G06V 40/166 356/603 |
| 2016/0125240 | A1* | 5/2016 | Danikhno | H04N 21/4126 348/78 |
| 2017/0308763 | A1* | 10/2017 | Salmelin | G06V 40/67 |
| 2019/0087657 | A1* | 3/2019 | Wang | G06T 7/11 |
| 2021/0256103 | A1* | 8/2021 | Bolme | H04N 23/20 |
| 2022/0398820 | A1* | 12/2022 | Abd-Almageed | G06V 10/141 |

FOREIGN PATENT DOCUMENTS

| | | | | |
|---|---|---|---|---|
| WO | WO-2016010720 A1 * | 1/2016 | | G06K 9/00597 |
| WO | WO-2016033184 A1 * | 3/2016 | | G06F 21/32 |
| WO | WO-2018022589 A1 * | 2/2018 | | G06F 21/32 |

OTHER PUBLICATIONS

Visible/Infrared Face Spoofing Detection using Texture Descriptors; Shaimaa Mohamed et al; MATEC Web of Conferences, 292, 04006; 2019. (Year: 2019).*

Spoofing Real-world Face Authentication Systems through Optical Synthesis; Yueli Yan et al; IEE Symposium on Security and Privacy; 2023. (Year: 2023).*

Iris Liveness Detection for Next Generation Smartphones; Shejin Thavalengal et al; IEEE; published electronically on Jun. 29, 2016. (Year: 2016).*

* cited by examiner

FACE BIOMETRIC RECOGNITION WITH ANTI-SPOOFING

CROSS-REFERENCE TO RELATED APPLICATIONS

This application claims priority to and the benefit of U.S. Provisional Patent Application No. 63/335,252, filed Apr. 27, 2022, the entire disclosure of which is incorporated by reference herein.

TECHNICAL FIELD

This disclosure relates to biometric recognition. More specifically, this disclosure relates to face biometric recognition.

BACKGROUND

Individuals can be recognized using a variety of biometric methods, e.g., face, fingerprint, and irises. Some of these biometric methods, such as fingerprint recognition methods, require individuals to touch or contact the biometric recognition device. This can be difficult for some individuals or during periods where users of such biometric recognition systems do not want to touch any surfaces that might have been contaminated by other individuals. Consequently, the use of such biometric recognition systems are shunned.

Face recognition systems capture an image of the face. The captured image of the face is then processed and compared against a reference database to determine if a match exists. Access is granted for a match, otherwise access is denied. A spoof face can be presented or used to trick the face recognition system. For example, the spoof face can be a photograph, a three-dimensional mask, or an image on an electronic screen. To detect spoofs, face recognition systems can employ face liveness criteria. These can include searching for printing or screen artifacts or looking for three-dimensionality. Simple high-resolution 2D printed or screen images or 3D masks can spoof such systems. Other face liveness methods use machine learning systems trained on live faces, look for eye motion, look for consistent face and background motion, or test found faces with patterned light. These methods are more difficult to spoof but still can be fooled by 3D face masks with mechanical eye motion. Finally, some face liveness methods use active means to test users' responses to commands using blinks, head positioning, and spoken words. However, these methods involve interactions with the users, which complicate use in multilingual environments, noisy environments, with users with deaf users, and with users who do not obey the machine requests.

Such presentation attacks, when successful, compromise the security of a system that uses face recognition as the key for physical or logical access. That is, the use of the face recognition system is defeated.

SUMMARY

Disclosed herein are methods, apparatus, and systems for facial recognition with anti-spoofing.

In implementations, a biometric recognition device includes at least one non-visible illuminator, at least one image capture device, and a processor. The at least one non-visible illuminator and the at least one image capture device in a differential measurement configuration. The at least one image capture device configured to capture one or more images of at least a facial portion of a user. The processor connected to the at least one image capture device and the at least one non-visible illuminator. The processor configured to determine one or more eyes and a face from the one or more images, perform liveness detection by comparing one or more pupil images from even-odd image pairs from the one or more images, wherein a non-noise color or brightness difference indicates pupil liveness or a live face, perform face encoding on the live face to generate a face template, perform face matching on the face template to generate a face result, and use one or more of the liveness result and the face result to enable the user to access an object.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, access control, face recognition, iris recognition, and the like. The unit of executable software generally runs in a predetermined environment, computing device, server, and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and/or methods. Those of ordinary skill may thus recognize that other elements and/or steps may be desirable or necessary to implement the devices, systems, and/or methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, apparatus, and systems for face biometric recognition with anti-spoofing. In some implementations, the face biometric recognition system provides a method and system which determines the liveness of a face presented to the face biometric recognition system using a combination of visible and/or non-visible illumination techniques. The face biometric recognition system determines live retinal reflection by making a differential measurement between images of one or two pupil(s) in reaction to lighting conditions, illuminator and camera geometry, and/or combinations thereof. The one or more pupil(s) can appear bright or dark in the images depending on the lighting conditions, the illuminator and camera geometry, and/or combinations thereof. The differential measurement would indicate liveness if a difference exists and a spoof if no difference exists. The illumination can be visible spectrum, non-visible spectrum, and/or combinations thereof.

In some implementations, the face biometric recognition system reduces the probability of a successful presentation attack by increasing the number of criteria a face must meet to be judged live rather than a spoof. The system imposes multiple face and/or eye criteria that a live face must satisfy to qualify a presenter. If any of these criteria is not met, the presenter is denied. The criteria can include, but is not limited to, live retinal reflection, live angle-dependent retinal reflection, properly positioned eyes relative to a face, and consistent visible light and non-visible light facial positioning. In some implementations, the non-visible light is infrared or near-infrared.

In some implementations, information collected by face biometric recognition system can be subsequently used as a multi-modal biometric, i.e., using iris biometric recognition, for high confidence recognition and as a biometric record of the presenter whether the presenter is identified, not identified, or rejected as a spoof presentation. In some implementations, forensic analysis or investigations can be performed using the information collected by face biometric recognition system. In some implementations, information collected by face biometric recognition system can be nearly simultaneously or sequentially used as multi-modal biometric, i.e., using iris biometric recognition, for high confidence recognition and as a biometric record of the presenter whether the presenter is identified, not identified, or rejected as a spoof presentation.

In some implementations, a face biometric recognition system can add and use a non-visible illuminator and use a camera of the face biometric recognition system in an unfiltered configuration to capture and produce a stream of images without and with the non-visible illuminator turned on. In this implementation, a source of visible ambient light is available. A differential measurement can be made between successive images or between even-odd numbered pairs of images, e.g., 1 and 2, 1 and 4, 3 and 4, and so on, to determine live retinal reflection.

In some implementations, a face biometric recognition system can add and use a pair of non-visible illuminators and use the camera of the face biometric recognition system in a filtered configuration to capture and produce a stream of images by sequencing a turning on and off of the pair of non-visible illuminators. In this instance, a first non-visible illuminator is axially close to the camera (to see a bright pupil(s)) and a second non-visible illuminator is angularly separated from the camera (to see a dark pupil(s)) to provide a reliable and perceptible difference in a color or brightness of one or two pupils. The term axially close or axially aligned refers to alignment with an optical axis of the camera or image capture device. In some implementations, the camera and the second non-visible illuminator are angularly separated by at least approximately 5°. In some implementations, the camera and the second non-visible illuminator are angularly separated by less than or equal to 5°. In this instance, temporal diversity is employed to determine live retinal reflection.

In some implementations, a face biometric recognition system can add and use a non-visible illuminator, can add and use a camera in a filtered configuration, and use a camera of the face biometric recognition system in a filtered configuration to capture and produce a stream of images for or at each camera when the single non-visible illuminator is turned on. In this instance, one camera is axially close to the non-visible illuminator (to see a bright pupil(s)) and the other camera is angularly separated from the non-visible illuminator (to see a dark pupil) to provide a reliable and perceptible difference in a color or brightness of one or two pupils. In some implementations, the other camera and the non-visible illuminator are angularly separated by at least approximately 5°. In some implementations, the camera and the second non-visible illuminator are angularly separated by less than or equal to 5°. In this instance, spatial diversity is employed to determine live retinal reflection.

Figure 1:
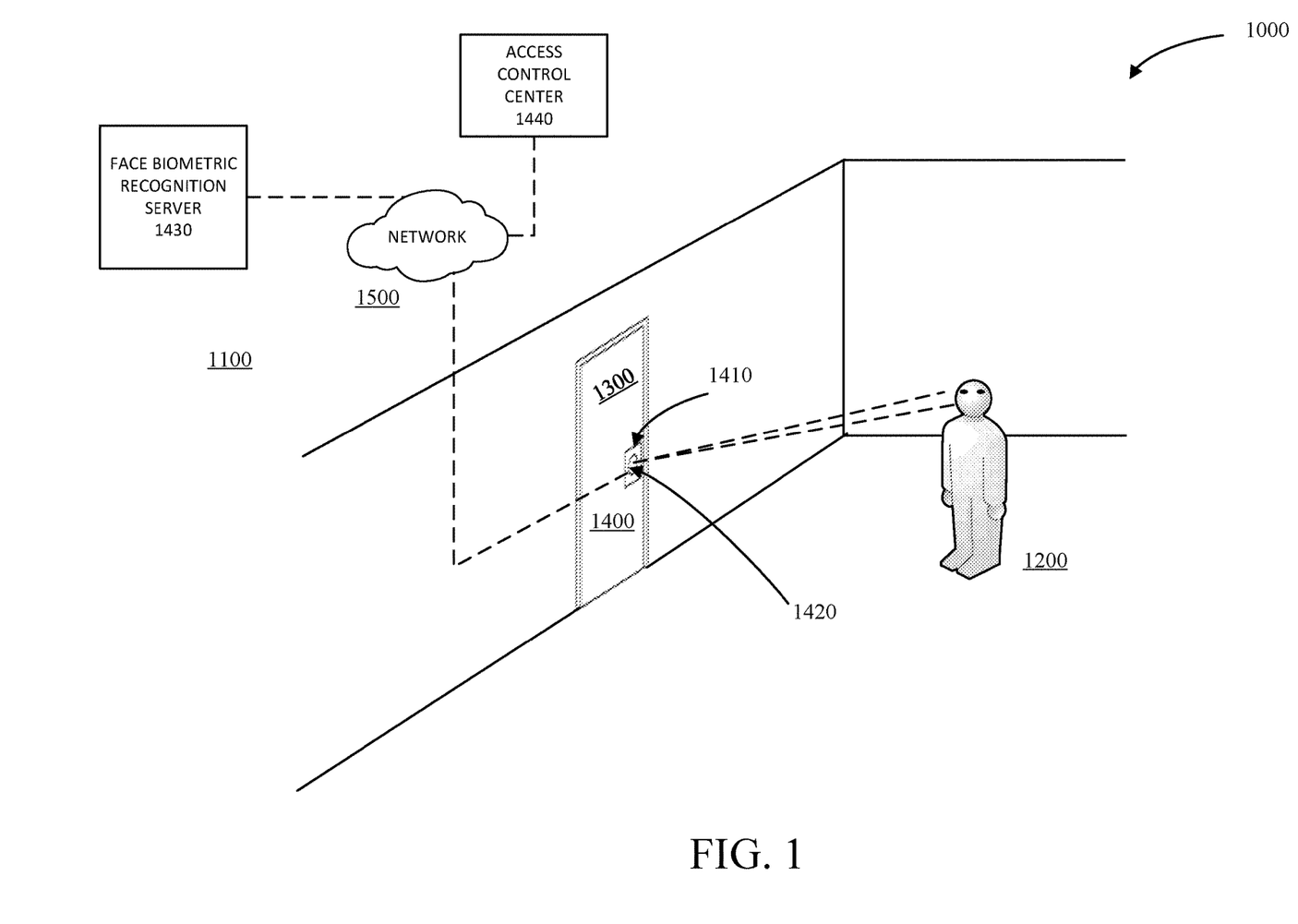
FIG. 1 is a diagram of an example architecture for face biometric recognition with anti-spoofing in accordance with some implementations of this disclosure.

FIG. 1 is a diagram of an example architecture or system 1000 for face biometric recognition in accordance with implementations of this disclosure. In some implementations, the architecture or system 1000 can be deployed, provided, or implemented in warehouses, offices, buildings, residences, hospitals, nursing homes, rehabilitation centers, vaults, airports, concerts, and other facilities or events. In some implementations, the architecture 1000 can include a room or building 1100 which is accessed by a user 1200 via a door 1300. The door 1300 is illustrative of an access controlled facility, object, and the like (collectively "access controlled entity"). The door 1300 can be opened or unlocked by an access control system 1400. In implementations, the access control system 1400 includes a face biometric recognition device 1410 and an access control module 1420. In some implementations, the access control system 1400 includes the face biometric recognition device 1410, the access control module 1420, and a face biometric recognition server 1430. In some implementations, the access control system 1400 includes the face biometric recognition device 1410, the access control module 1420, and an access control center 1440. In some implementations, the access control system 1400 includes face biometric recognition device 1410, the access control module 1420, the face biometric recognition server 1430, and the access control center 1440. In some implementations, the face biometric recognition device 1410, the access control module 1420, the face biometric recognition server 1430, and the access control center 1440, as appropriate and applicable, are connected or in communication (collectively "connected") using a network 1500. The architecture 1000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 2:
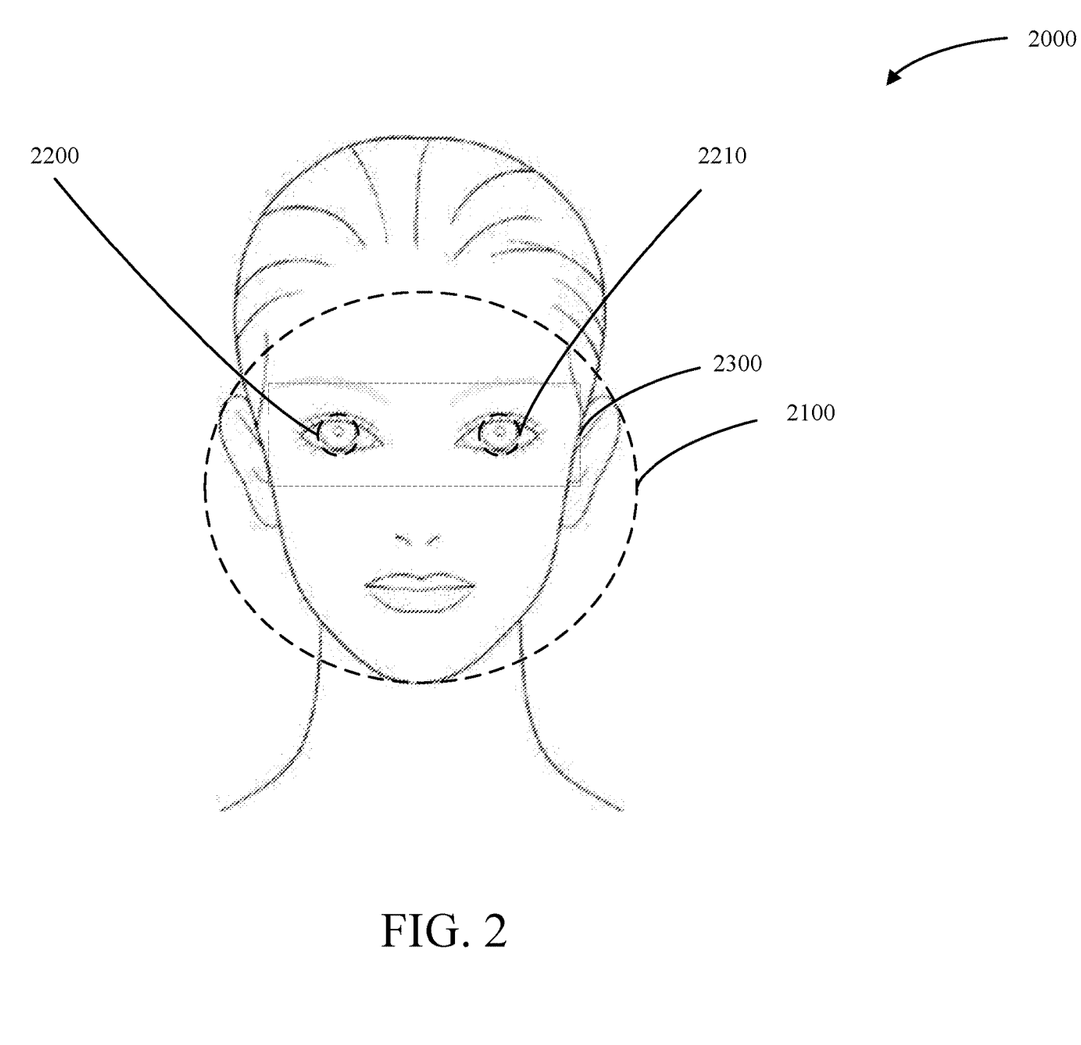
FIG. 2 is a diagram of an example face for face biometric recognition with anti-spoofing in accordance with some implementations of this disclosure.

Face biometric recognition systems with anti-spoofing capture an image of a face of a user to perform face or facial recognition. For example, as shown in FIG. 2, a face biometric recognition system captures an image of a face 2100 of a user 2000 to perform the face recognition. Referring now to both FIG. 1 and FIG. 2, the face recognition device 1410 is a touchless and contactless device for recognizing a user. The face biometric recognition device 1410 captures one or more images of the user 2000 with and without non-visible illumination. The face biometric recognition device 1410 finds one or both eyes 2200 and 2210 and extracts the relevant features, characteristics, and the like. The face biometric recognition device 1410 determines liveness detection or retinal reflection by performing a differential measurement between images captured with and without non-visible illumination, with non-visible illumination using temporal diversity, and/or with non-visible illumination using spatial diversity (collectively "differential measurement configurations"). In some implementations, the face biometric recognition device 1410 can use one or more additional anti-spoofing techniques. The one or more additional anti-spoofing techniques can include, but is not limited to, eye-face bounding box test, detection of face in non-visible illumination image, position of face with respect to camera and/or illuminator in visible illumination image, and/or position of face with respect to camera and/or illuminator in non-visible illumination image. A face template is formed from the extracted information. The face template is matched against enrolled face templates to determine if the user 2000 has access. In some implementations, the liveness detection and the face recognition can be performed sequentially, in any order, or can be performed substantially parallel. An access signal is generated based on the results of the matching. For example, the access signal can indicate a spoof, a live (human) face, a face match, no face match, and combinations thereof. In some implementations, the face biometric recognition device 1410 is a standalone device. In some implementations, the face biometric recognition device 1410 can communicate with the face biometric recognition server 1430 and the access control center 1440 to collectively determine access based on the results of the matching and/or liveness detection.

The access control module 1420 can receive the access signal from the face biometric recognition device 1410. The access control module 1420 can open or unlock the door 1300 based on the access signal. In some implementations, the access control module 1420 can send a signal to a lock/unlock device (not shown) on the door 1300 to open or unlock. In some implementations, the access control module 1420 can receive the access signal from the access control center 1440. In some implementations, the access control module 1420 can receive the access signal from the face biometric recognition server 1430. In some implementations, the access control module 1420 can receive the access signal from a combination of the face biometric recognition device 1410, the face biometric recognition server 1430, and the access control center 1440. In some implementations, the access control module 1420 is integrated with the face biometric recognition device 1410. In some implementations, the access control module 1420 is integrated with the door 1300. In some implementations, the access control module 1420 is a standalone device in communication with the face biometric recognition device 1410, the door 1300, the face biometric recognition server 1430, the access control center 1440, or combinations thereof.

The face biometric recognition server 1430 can receive captured images from the face biometric recognition device 1410. The face biometric recognition server 1430 can perform liveness detection and face biometric recognition as described herein for the face biometric recognition device 1410. The face biometric recognition server 1430 can communicate results to the face biometric recognition device 1410, the access control module 1420, the access control center 1440, or combinations thereof.

The access control center 1440 can be smart monitors, smartphones, computers, desktop computers, handheld computers, personal media devices, notebooks, notepads, phablets and the like which can communicate between the face biometric recognition device 1410, the access control module 1420, the face biometric recognition server 1430, or combinations thereof. The access control center 1440 can review the results from the liveness detection and the matching by the face biometric recognition device 1410, the face recognition server 1430, or combinations thereof to determine what access signal should be sent to the access control module 1420.

The network 1500 may be, but is not limited to, the Internet, an intranet, a low power wide area network (LP-WAN), a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof.

Figure 3:
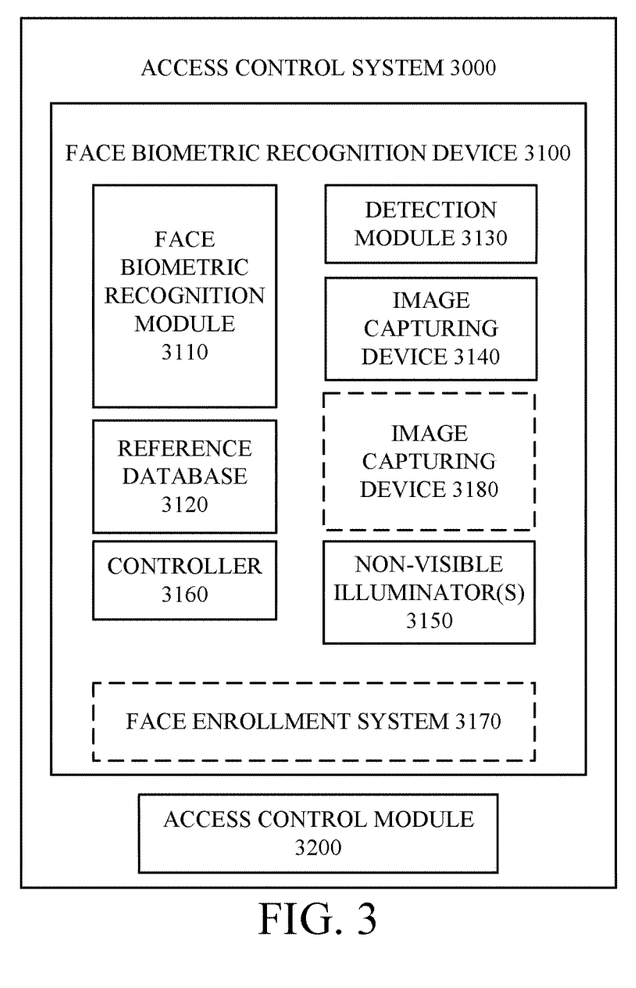
FIG. 3 is a diagram of an example access control system with an example face biometric recognition device with anti-spoofing in accordance with some implementations of this disclosure.

FIG. 3 is a diagram of an example access control system 3000 with an example face biometric recognition device 3100 in accordance with implementations of this disclosure. The access control system 3000 can include the face biometric recognition device 3100 in communication with an access control module 3200. The face biometric recognition device 3100 can include a face biometric recognition module 3110, a reference database 3120, a detection module 3130, an image capturing device 3140, one or more non-visible illuminator(s) 3150, and a controller 3160. In some implementations, the face biometric recognition device 3100 can include a face biometric enrollment system 3170. In some implementations, the face biometric recognition device 3100 can include a second image capturing device 3180. In some implementations, the face biometric recognition device 3100 and the access control module 3200 can be an integrated device. In implementations, the face biometric recognition device 3100 and the access control module 3200 can be connected standalone devices. The access control system 3000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The detection module 3130 can be a motion sensor, a proximity sensor, and like device which can determine the presence of an individual or whether an individual is proximate to an access controlled device. The detection module 3130 can awaken or signal the access control system 3000, the face biometric recognition device 3100, or combinations thereof of the presence of the user or individual. In some implementations, the access control system 3000 can be in a low power mode or on persistently to perform scanning. Activation of the access control system 3000 occurs when the scanning finds a scannable object.

The image capturing device 3140 and/or the image capturing device 3180, when appropriate, can be a camera, an imager, or like device for capturing one or more images of the individual. The image capturing device 3140 and/or the image capturing device 3180, when appropriate, is configured for operation in a visible and a non-visible frequency, wavelength, and/or spectrum (collectively "spectrum"). In some implementations, the non-visible spectrum is infrared, near-infrared (NIR), and the like. In some implementations, the image capturing device 3140 is configured for operation without a non-visible spectrum filter. In some implementations, the image capturing device 3140 and/or the image capturing device 3180, when appropriate, is configured for operation with a non-visible spectrum filter. The non-visible spectrum filter can be used to direct non-visible spectrum toward the image capturing device 3150 and 3180, when appropriate. In some implementations, the image capturing device 3180, when appropriate, is a non-visible spectrum image capturing device.

The one or more non-visible illuminator(s) 3150 can be one or more light sources, light emitting diodes, and the like which can illuminate the individual in coordination with capturing an image of the individual. In implementations, the one or more non-visible illuminator(s) 3150 can be infrared light sources, infrared light emitting diodes (LEDs), NIR light sources, NIR LEDs, and the like.

The face biometric recognition module 3110 can perform liveness detection and face biometric recognition on the captured images as described herein. In some implementations, the face biometric recognition module 3110 finds the face and the one or more eye(s) in the captured images and determines a liveness detection by performing a differential measurement between images captured using one or more of the image capturing device 3140, the image capturing device 3180, when appropriate, and the one or more non-visible illuminator(s) 3150 configured in one of the differential measurement configurations. The face biometric recognition module 3110 encodes and generates appropriate or applicable face templates, representations, or the like, and matches the face templates to enrolled templates stored in the reference database 3120. The face biometric recognition module 3110 can send liveness detection and matching results to the access control module 3200. In implementations, the results can be scores, a decision, or combinations thereof.

The reference database 3120 can include face templates and other like templates for individuals enrolled in the access control system 3000.

The controller 3160 can control and coordinate the operation of the detection module 3130, the image capturing device 3140, the image capturing device 3180, when appropriate, the one or more illuminator(s) 3150, and if applicable, the face biometric enrollment system 3170.

The face biometric enrollment system 3170 can enroll individuals into the access control system 3000. The image capturing device 3140 and the one or more illuminator(s) 3150 can capture images of individuals which are processed by the face biometric recognition module 3110 to generate face templates. The face templates can then be stored in the reference database 3120 for matching analysis by the face biometric recognition module 3110.

The access control module 3200 can receive liveness detection and matching results from the face biometric recognition device 3100. If liveness is detected and a positive match occurs, the access control module 3200 can open or unlock the access controlled entity for the individual or send a signal to the access controlled entity, which in turn can cause the access controlled entity to open or unlock. In some implementations, additional anti-spoofing measurements as described herein are also checked and confirmed. If liveness is not detected and/or no match occurs, the access control module 3200 can provide or send an alert accordingly. In some implementations, the access control module 3200 can access other security systems to determine security, access, authorization levels or the like for a matched individual. That is, the face biometric recognition is one of multiple steps in providing access to a secured asset.

Figure 4:
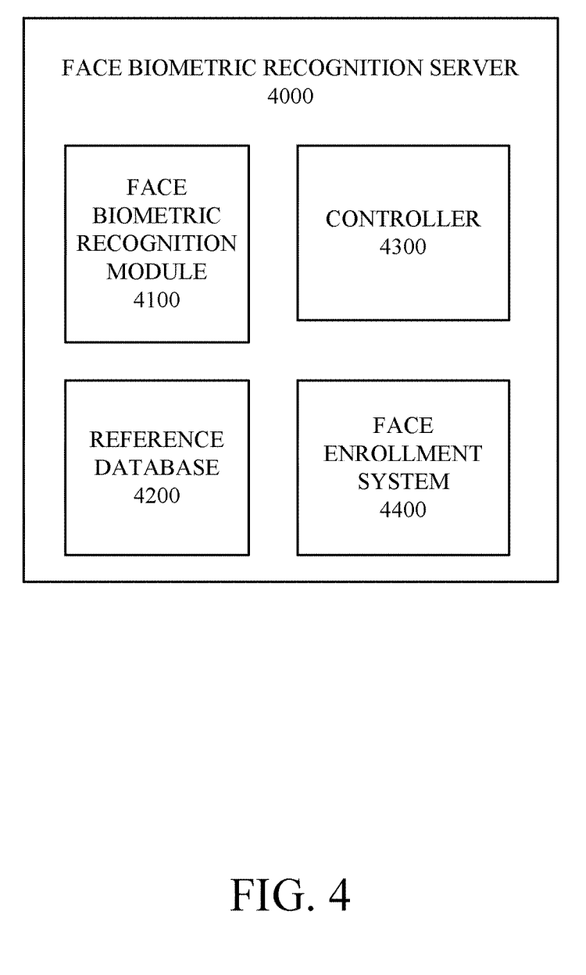
FIG. 4 is a diagram of an example face biometric recognition server for use with the access control system of FIG. 3 in accordance with some implementations of this disclosure.

FIG. 4 is a diagram of an example face biometric recognition server 4000 for use with the access control system 3000 of FIG. 3 in accordance with implementations of this disclosure. The face biometric recognition server 4000 can include a face biometric recognition module 4100, a reference database 4200, a controller 4300, and a face biometric enrollment system 4400. The face biometric recognition server 4000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The face biometric recognition server 4000 can communicate with the access control system 3000, the face biometric recognition device 3100, the access control module 3200, and combinations thereof via a network such as network 1500. The face biometric recognition module 4100 can operate as described for the face biometric recognition module 3110. The reference database 4200 can operate as described herein for the reference database 3120. The controller 4300 can control and coordinate the operation of face biometric recognition device 3100, the access control module 3200, the face biometric recognition module 4100, the reference database 4200, the face biometric enrollment system 4400, and combinations thereof.

The liveness detection is a differential measurement between two images, where a first image includes a bright (dark) pupil(s) and a second image includes a dark (bright) pupil(s).

Figure 5:
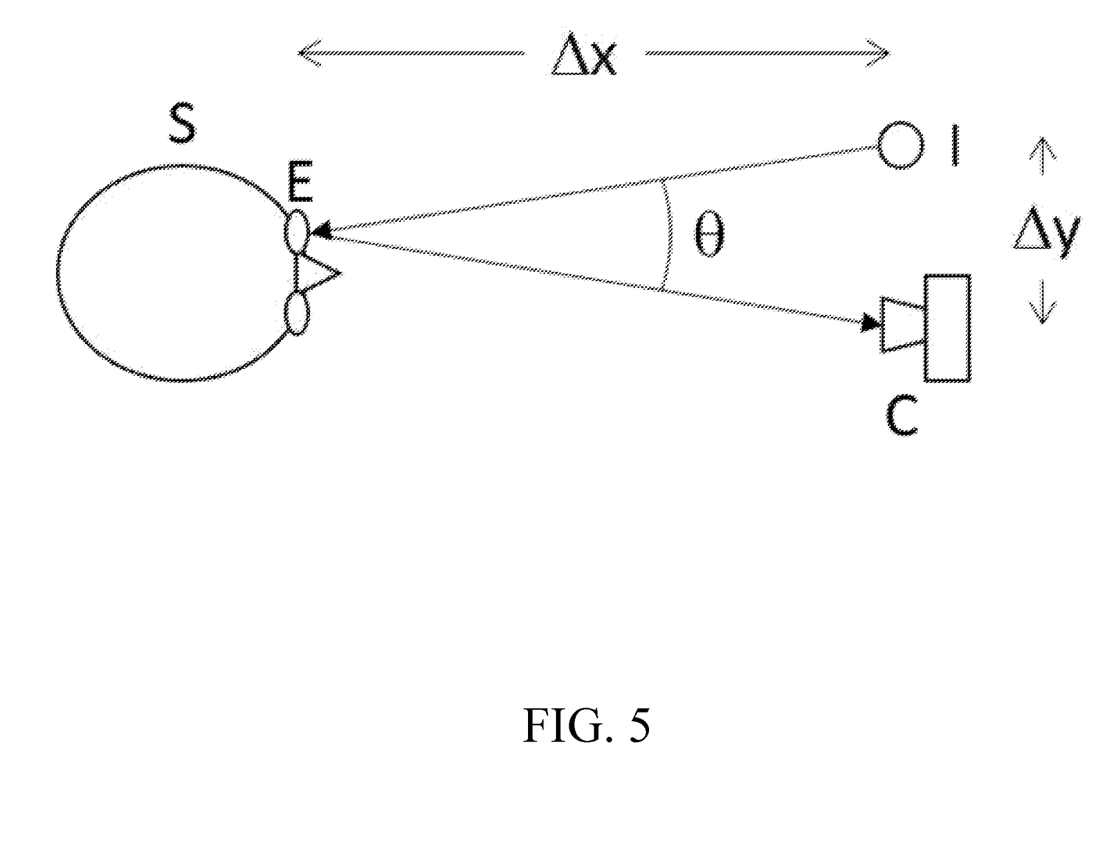
FIG. 5 is a diagram of an example geometrical relationship for eye liveness detection in accordance with some implementations of this disclosure.

FIG. 5 is a diagram of an example geometrical relationship for liveness detection. A geometrical relationship is defined between a subject (S) and the subject's eye (E) with respect to an illuminator (I) and a camera (C) where $\Delta x$ is distance between the subject S and the illuminator I and camera C, and $\Delta y$ is the distance between the distance between the camera C and the illuminator I. Light leaving the illuminator I and entering a subject's pupil travels along a line I-E. Light scattered from the eye tissue behind the pupil returns from the subject to a camera along a second line E-C. If the angle $\theta$ between lines I-E and E-C is less than a critical angle, light entering the pupil and reflecting from the retina at the back of the eye E returns to the camera C making the retina, as viewed through the pupil, appear bright (red-eye or infrared-eye effect). Red-eye or infrared-eye can be largely suppressed by ensuring the angle between lines I-E and E-C exceeds 5 or 6 degrees. As a rule of thumb, even for subjects with large pupils, if the spacing between the center of the camera lens and the near edge of the light source is at least a tenth of the distance from the camera to the subject, significant red-eye resulting from retinal reflection will not occur and the subject's pupils will appear black in a photograph. For camera-illuminator arrangements with an angle $\theta<5$ degrees, the amount of retinal reflection that causes pupil brightening varies dramatically with pupil size, between subjects, and even across the pupil of a given subject. In such an arrangement, the brightness of a pupil can range from black (no infrared light returning to camera) to white (lots of infrared light returning to the camera).

Figure 6:
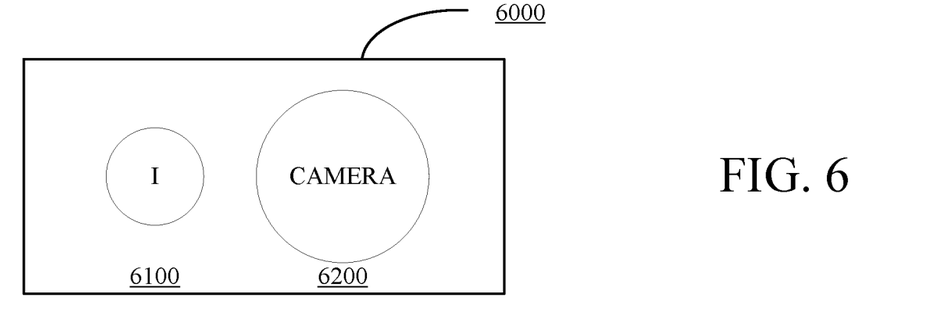
FIG. 6 is a diagram of an example configuration of a face recognition device with anti-spoofing in accordance with some implementations of this disclosure.
Figure 7:
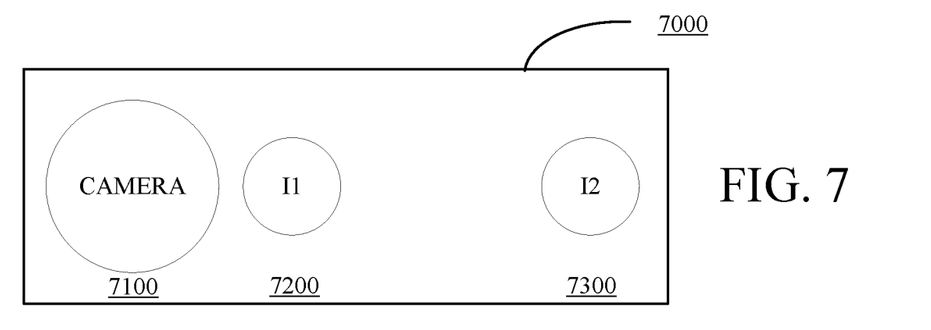
FIG. 7 is a diagram of an example configuration of a face recognition device with anti-spoofing in accordance with some implementations of this disclosure.
Figure 8:
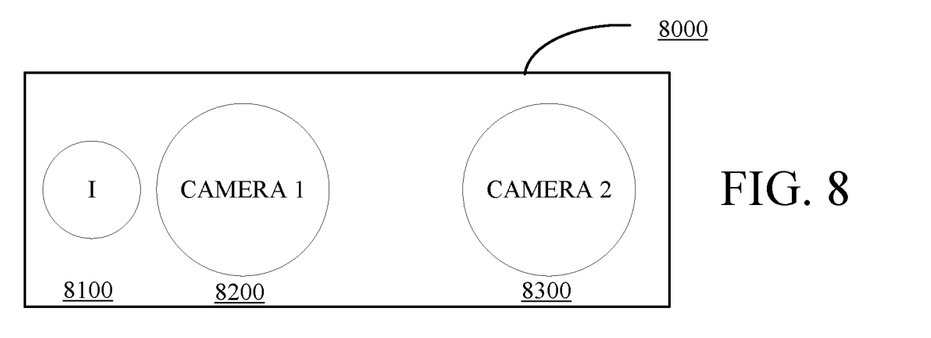
FIG. 8 is a diagram of an example configuration of a face recognition device with anti-spoofing in accordance with some implementations of this disclosure.

FIGS. 6-8 are example differential measurement configurations for the illuminator(s) and image capturing device(s) in accordance with implementations of this disclosure. In some implementations, the illuminator(s) are non-visible illuminators such as the non-visible illuminators 3150. In some implementations, the image capturing device(s) are the image capturing device 3140 and/or the image capturing device 3180.

FIG. 6 is a diagram of an example differential measurement configuration of a face biometric recognition device 6000 in accordance with implementations of this disclosure. The face biometric recognition device 6000 can include an illuminator 6100 and an image capturing device 6200. The image capturing device 6200 is the image capturing device used for face biometric recognition. In this instance, the image capturing device 6200 is configured for operation without a non-visible filter. This enables the image capturing device 6200 to see the eye when the illuminator 6100 is turned off. In this instance, the pupil will appear dark or darker due to lack of illumination directly or nearly directly into the pupil(s). The illuminator 6100 and the image capturing device 6200 are in substantial axial alignment. That is, the angle $\theta$ between the illuminator 6100 and the image capturing device 6200 is kept small to ensure that the pupil appears bright or brighter when the illuminator 6100 is turned on. Liveness is detected by differential measurements between images taken when the illuminator 6100 is off and when the illuminator 6100 is on. The differential measurements are determined with respect to the location of the pupil(s) area, which will appear darker (brighter) in one image and brighter (darker) in another image as described herein. The differential measurements can be measured or obtained using standard image processing techniques, for example, using ratio or difference comparisons.

FIG. 7 is a diagram of an example differential measurement configuration of a face biometric recognition device 7000 in accordance with implementations of this disclosure. The face biometric recognition device 7000 can include an image capturing device 7100, a first illuminator 7200, and a second illuminator 7300. The image capturing device 7100 is the image capturing device used for face biometric recognition. In this instance, the image capturing device 7100 is configured for operation with a non-visible filter.

The image capturing device 7100 and the first illuminator 7200 are in substantial axial alignment. That is, the angle θ between the image capturing device 7100 and the first illuminator 7200 is kept small to ensure that the pupil appears bright or brighter when the first illuminator 7200 is turned on and the second illuminator 7300 is turned off. The image capturing device 7100 and second illuminator 7300 are separated such that the angle θ is sufficient to provide a reliable perceptible difference in the color or brightness when the first illuminator 7200 is turned off and the second illuminator 7300 is turned on. In some implementations, the angle θ between the image capturing device 7100 and second illuminator 7300 is or exceeds 5° or 6° to mitigate redeye as described herein.

In this configuration, the first illuminator 7200 and the second illuminator 7300 are flashed at times separated by a short time interval so that the user or subject position is relatively unchanged while the image capturing device 7100 captures eye images at each flash. Liveness is detected by differential measurements between images taken as the first illuminator 7200 and the second illuminator 7300 are flashed or sequenced. The differential measurements are determined and obtained as described herein.

FIG. 8 is a diagram of an example differential measurement configuration of a face biometric recognition device 8000 in accordance with implementations of this disclosure. The face biometric recognition device 8000 can include an illuminator 8100, a first image capturing device 8200, and a second image capturing device 8300. In some implementations, the first image capturing device 8200 is the image capturing device used for face biometric recognition. In this instance, the first image capturing device 8200 and the second image capturing device 8300 are configured for operation with non-visible filters.

The illuminator 8100 and the first image capturing device 8200 are in substantial axial alignment. That is, the angle θ between the illuminator 8100 and the first image capturing device 8200 is kept small to ensure that the pupil appears bright or brighter when the illuminator 8100 is turned on. The illuminator 8100 and the second image capturing device 8300 are separated such that the angle θ is sufficient to provide a reliable perceptible difference in the color or brightness when the illuminator 8100 is turned on. In some implementations, the angle θ between the illuminator 8100 and the second image capturing device 8300 is or exceeds 5° or 6° to mitigate redeye as described herein.

In this configuration, the illuminator 8100 can flash once while the first image capturing device 8200 and the second image capturing device 8300 can capture near simultaneous or simultaneous images from different angles with respect to an eye of a subject. Liveness is detected by differential measurements between images taken by the first image capturing device 8200 and the second image capturing device 8300. The differential measurements are determined and obtained as described herein.

Figure 9:
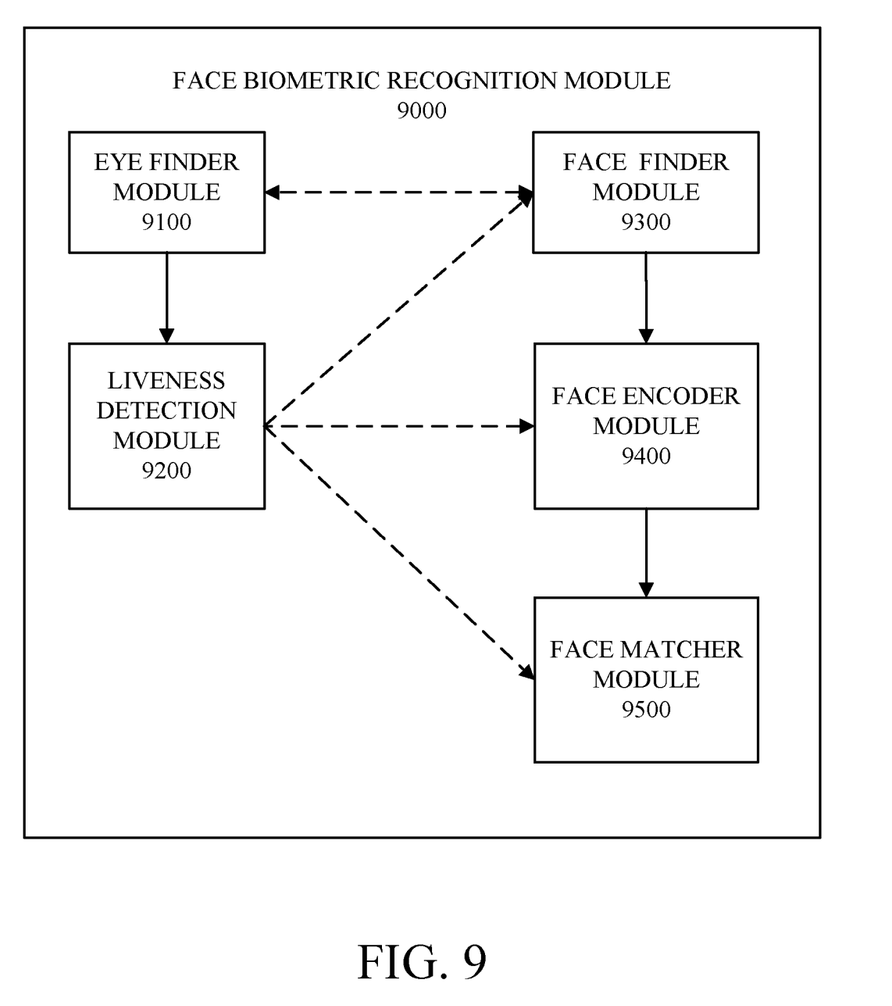
FIG. 9 is a diagram of an example of a face recognition module with anti-spoofing in accordance with some implementations of this disclosure.

FIG. 9 is a diagram of an example face biometric recognition module 9000 in accordance with implementations of this disclosure. In implementations, the face biometric recognition module 9000 is the face biometric recognition module 3110 in FIG. 3 and the face biometric recognition module 4100 in FIG. 4. The face biometric recognition module 9000 can include an eye finder module 9100, a liveness detection module 9200, a face finder module 9300, a face encoder module 9400, and a face matcher module 9500.

The eye finder module 9100 can locate one or more eyes of the subject. In some implementations, the eye finder module 9100 can share information with the face finder module 9300 to assist the face finder module 9300 in locating the face of the subject. This can increase speed and efficiencies.

The liveness detection module 9200 can determine the liveness of the eye(s) as described herein. The results of the liveness detection module 9200 can be shared with the face finder module 9300, the face encoder module 9400, the face matcher module 9500, or combinations thereof. A negative result or detection of a spoof can stop further processing and alert an access control system as described herein.

The face finder module 9300 can locate or extract features of the subject's face including eyes, eyelids, eyelashes, eyebrows, eye sockets, nose, mouth, chin, and the surrounding tissue thereof (collectively "landmarks"). In implementations, the face finder module 9300 can share this information with the eye finder module 9100 to assist the eye finder module 9100. This can increase speed and efficiencies. The face encoder module 9400 can encode the landmarks and generate a face template. The face matcher module 9500 can compare the face template against face enrolled templates and provide face match scores. In implementations, the face matcher module 9500 can provide results using a variety of known techniques.

In some implementations, the eye finder module 9100 and the liveness detection module 9200 can execute in parallel with the face finder module 9300, the face encoder module 9400, and the face matcher module 9500. This can increase speed and efficiencies.

Operationally, with reference to FIGS. 1-9, an individual 1200 self-aligns to a camera(s) or is automatically aligned to a camera(s), such as the image capturing device 3140 and/or the image capturing device 3180, in the face biometric recognition device 1410. The camera(s), in conjunction with non-visible illuminators, such as the one or more non-visible illuminator(s) 3150, can produce a set of images of the individual 1200. The camera(s) and the non-visible illuminators are in one of the differential measurement configurations described herein. In particular, the set of images includes one or more images with one or more iris(es), pupil(s), and/or eye(s) (collectively "pupil(s)") in a first state and other images with one or more pupil(s) in a second state. The first state and the second state are differentiable based on level of color or brightness in the one or more pupil(s) in response to non-visible illumination.

Each captured image or frame is submitted for analysis to a pair of algorithmic subsystems. A first analytic subsystem performs eye-finding and liveness detection upon the found eye(s). For example, the first analytic subsystem can be the eye finder module 9100 and the liveness detection module 9200. An appropriate pair of images from the set of images are submitted to the liveness detection module 9200. The one or more pupil(s) in the pair of images are differentially measured or compared for differences. A difference (other than minimal or noise-type or level differences) is indicative of a live (human) eye and live (human). Processing can be stopped if no differences are determined, which can indicate a spoof. In some implementations, additional anti-spoofing measures can be executed as described herein.

Each captured image or frame is submitted to a second algorithmic subsystem. The second analytic subsystem finds the face, extracts and encodes features of the individual's 1200 face including eyes, eyelids, eyelashes, eyebrows, eye sockets, nose, mouth, chin, and the surrounding tissue thereof, and attempts to match the face template. For example, the second analytic subsystem can be the face finder module 9300, the face encoder module 9400, and the face matcher module 9500. The processing in the second algorithmic subsystem can be halted based on liveness detection results from the first algorithmic subsystem.

A face template is formed for each frame. The face template is submitted to the face recognition or matching algorithm. The face matching algorithm, for example as implemented in the face matcher module 9500, seeks a match to the face template from among enrolled face templates.

Figure 10:
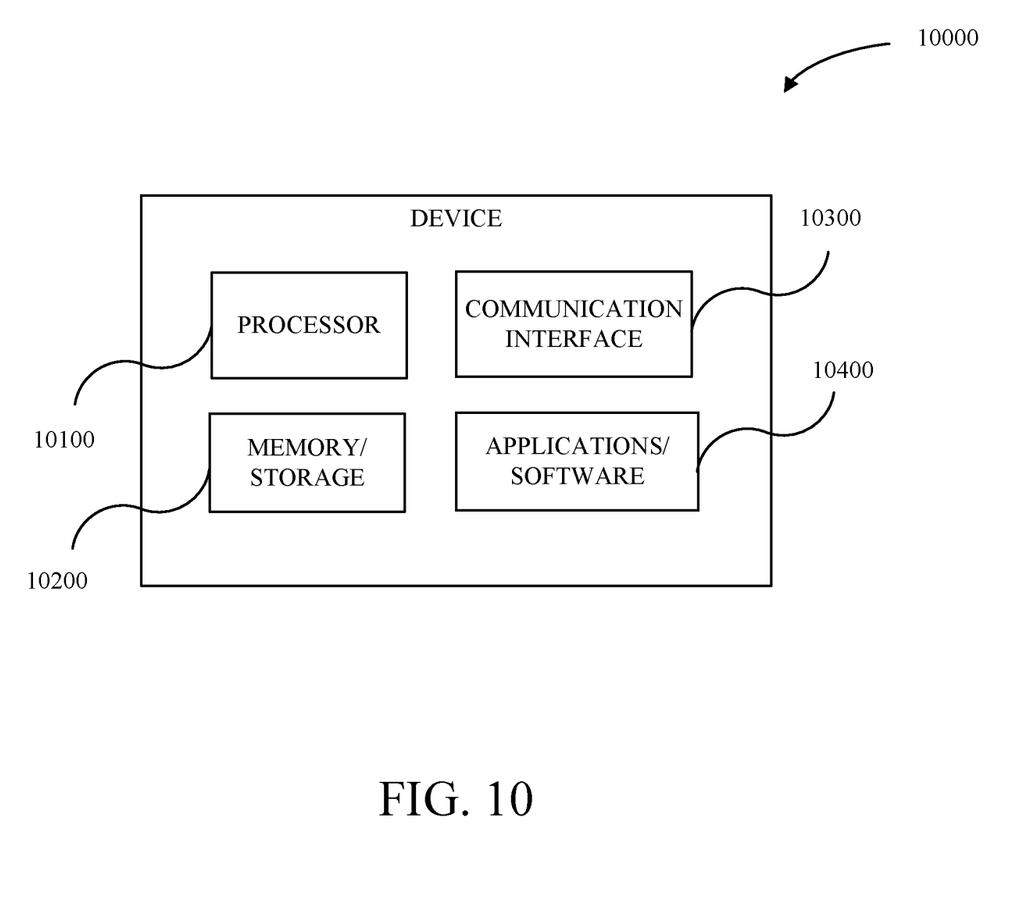
FIG. 10 is a block diagram of an example of a device in accordance with some implementations of this disclosure.

FIG. 10 is a block diagram of an example of a device 10000 in accordance with embodiments of this disclosure. The device 10000 may include, but is not limited to, a processor 10100, a memory/storage 10200, a communication interface 10300, and applications 10400. The device 10000 may include or implement, for example, the access control system 1400, the face biometric recognition device 1410, the access control module 1420, the face biometric recognition server 1430, the access control center 1440, the access control system 3000, the face biometric recognition device 3100, the access control module 3200, the face biometric recognition module 3110, the reference database 3120, the detection module 3130, the image capturing device 3140, the one or more non-visible illuminator(s) 3150, the controller 3160, the face biometric enrollment system 3170, the image capturing device 3180, the face biometric recognition server 4000, the face biometric recognition module 4100, the reference database 4200, the controller 4300, the face biometric enrollment system 4400, the face biometric recognition device 6000, the face biometric recognition device 7000, the face biometric recognition device 8000, the face biometric recognition module 9000, the eye finder module 9100, the liveness detection module 9200, the face finder module 9300, the face encoder module 9400, and the face matcher module 9500, for example. In an implementation, appropriate memory/storage 10200 may store the image(s), the eye information, the face information, the face template(s), face match scores, and liveness detection result. In some implementations, appropriate memory/storage 10200 is encoded with instructions for at least face biometric recognition, liveness detection, and access control. The face biometric recognition and liveness detection techniques or methods described herein may be stored in appropriate memory/storage 10200 and executed by the appropriate processor 10100 in cooperation with the memory/storage 10200, the communications interface 10300, and applications 10400, as appropriate. The device 10000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 11:
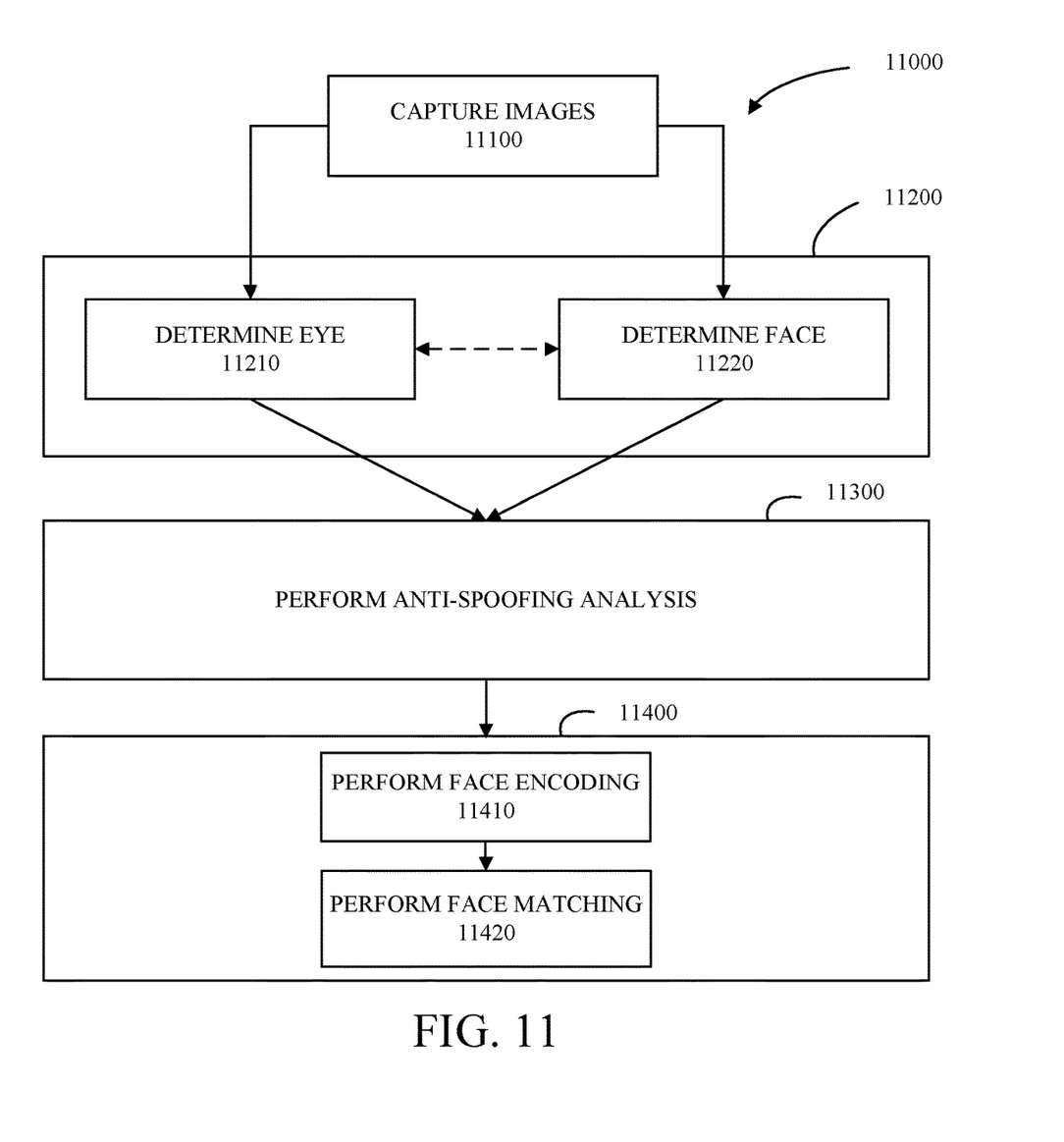
FIG. 11 is a flowchart of an example method for face biometric recognition with anti-spoofing in accordance with some implementations of this disclosure.

FIG. 11 is a flowchart of an example method 11000 for face biometric recognition in accordance with embodiments of this disclosure. The method 11000 includes: capturing 11100 a pair of images; finding 11200 eye(s) and a face; executing 11300 anti-spoofing analysis; and determining 11400 a face biometric result. In implementation, the order of operations, for example, anti-spoof testing before, after, or substantially in parallel with face finding, face encoding and face matching, can be tailored to the specific implementation to favor speed or accuracy as needed. The order of operations between liveness testing and face recognition can be determined by a particular use case. For example, the method 11000 may be implemented, as applicable and appropriate, by the architecture or system 1000 of FIG. 1, the access control system 1400, the face biometric recognition device 1410, the access control module 1420, the face biometric recognition server 1430, the access control center 1440, the access control system 3000, the face biometric recognition device 3100, the access control module 3200, the face biometric recognition module 3110, the reference database 3120, the detection module 3130, the image capturing device 3140, the one or more non-visible illuminator(s) 3150, the controller 3160, the face biometric enrollment system 3170, the image capturing device 3180, the face biometric recognition server 4000, the face biometric recognition module 4100, the reference database 4200, the controller 4300, the face biometric enrollment system 4400, the face biometric recognition device 6000, the face biometric recognition device 7000, the face biometric recognition device 8000, the face biometric recognition module 9000, the eye finder module 9100, the liveness detection module 9200, the face finder module 9300, the face encoder module 9400, the face matcher module 9500, the device 10000, the processor 10100, the memory/storage 10200, the communication interface 10300, and the applications 10400.

The method 11000 includes capturing 11100 images. In some implementations, one or more image capturing devices capture a subject's face in visible and non-visible illumination. In some implementations, one or more image capturing devices use one or more non-visible illuminators to capture one or more frames of images of a face or facial portion of a user. In some implementations, the one or more image capturing devices use one or more non-visible illuminators to capture one or more frames of images of an eye(s) of a user. In some implementations, the non-visible illuminator can be infrared illuminators and in particular, NIR illuminators. The one or more image capturing devices and the one or more non-visible illuminators are configured in a differential measurement configuration.

In some implementations, the differential measurement configuration can include an unfiltered image capture device configured to operate in visible and non-visible spectrum and a non-visible illuminator. Images are captured with the non-visible illuminator turned off and with the non-visible illuminator turned on.

In some implementations, the differential measurement configuration can include a filtered image capture device configured to operate in visible and non-visible spectrum and a pair of non-visible illuminators. The filtered image capture device and one non-visible illuminator are substantially axially aligned and the filtered image capture device and the other one non-visible illuminator are angularly separated to provide a reliable predictable difference in the level of color or brightness at one or more pupil(s) relative to the non-visible illuminator axially aligned with the filtered image capture device. Images are captured while alternately turning on one non-visible illuminator of the pair of non-visible illuminators.

In some implementations, the differential measurement configuration can include a non-visible illuminator and a pair of filtered image capture devices configured to receive visible and non-visible spectrum and operate in the non-visible spectrum. The non-visible illuminator and one filtered image capture device are substantially axially aligned and the non-visible illuminator and the other filtered image capture device are angularly separated to provide a reliable predictable difference in the level of color or brightness at one or more pupil(s) relative to the non-visible illuminator axially aligned with the filtered image capture device. Images are captured substantially simultaneously by each filtered image capture device of the pair of filtered image capture devices when the non-visible illuminator is on.

The method 11000 includes finding 11200 an eye(s) and a face. In some implementations, the finding 11200 outputs one or more eye(s) from each image and a face from each image. The finding 11200 includes determining 11210 the eye(s) and determining 11220 face. The execution of the determining 11210 and the determining 11220 can be parallel, sequential, order reversed, or combinations thereof. In implementations, the results from the determining 11210 can be used by the determining 11220 to assist in determination of the face and vice versa using known techniques. In some implementations, the determining 11210 and the determining 11230 can exchange information to assist in the determination of the eye(s) and the face, as appropriate.

The method 11000 includes executing 11300 anti-spoofing analysis. The anti-spoofing analysis can include one or more anti-spoofing techniques. The number or variety of the anti-spoofing techniques can depend on the environment, scenario, security setting, access setting, financial records, medical information, a music playing list, other like factors. The anti-spoofing techniques can include liveness detection or determination of human (live) retinal reflection. As described herein, when an illumination source is close to the eye's optical axis, brighter retinal reflections are expected from a live eye than when the light source is at least 5° degrees off-axis. A live eye shows differential retinal reflection when the angle of illumination varies, for example, in time or space. This is implemented using one of the differential measurement configurations to capture the images. A differential measurement is made using an appropriate pair of images from the captured images. For example, images 1 and 2, images 1 and 4, images 2 and 3, and so on can be used.

In some implementations, the anti-spoofing techniques can include determining whether the pupil(s) lie within a bounding box 2300 of a found face 2100 as shown in FIG. 2. This criteria prevents a spoofer from showing a printed face and peeking around the face to show one or two live eyes.

In some implementations, the anti-spoofing techniques can include determining whether the found face appears in a NIR image. In many cases, the ink or pigments used for color printing do not provide contrast in the NIR spectrum so a NIR face is not found. In cases of presentation using electronic screens, no NIR face image can be found because the LCD screen offers no contrast in the NIR spectrum.

In some implementations, the anti-spoofing techniques can include determining whether a NIR face appears in a position consistent with camera position and angles.

In some implementations, the anti-spoofing techniques can include determining whether a visible face appears in a position consistent with camera position and angles.

In some implementations, the anti-spoofing techniques can include storing collected biometric information for later forensic analysis if needed. For example, by presenting their face, iris, or irises, a potential spoofer is akin to a bank robber on camera without a mask. The stored biometric information can be submitted to iris matching subsystems. For example, in cases in which the subject is not identified as belonging to an enrolled population, the recorded face and NIR dual iris image can be stored. Stored imagery can be later mined to identify individuals attempting to spoof the system. Accordingly, the system will not only defend against presentation spoofs but serve as a dual-modality biometric recognition system since iris images are already recorded during the liveness test procedure.

In some implementations, the anti-spoofing techniques can include face anti-spoofing techniques as are generally known.

In some implementations, the anti-spoofing techniques can include liveness detection and one or more of the described anti-spoofing techniques.

The method 11000 includes determining 11400 a face biometric result. The determining 11400 includes performing 11410 face encoding and performing 11420 face matching, both executed as described herein and using known techniques.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for biometric recognition, the method comprising:
    capturing, cooperatively by one or more image capture devices and one or more non-visible illuminators in a differential measurement configuration, one or more image frames of at least a face of a user;
    determining a face from the one or more image frames;
    determining one or more eyes from the one or more image frames;
    determining a differential measurement between pupil images from the one or more image frames which represent a first state and pupil images from the one or more image frames which represent a second state, wherein a measurable difference indicates liveness of one or more pupils associated with the one or more eyes;
    performing face encoding on the face to generate a face template in view of a liveness result which is positive;
    performing face matching on the face template to generate a face result in view of the liveness result which is positive; and
    using one or more of the liveness result and the face result to enable the user to access an object,
    wherein for the differential measurement configuration:
    the one or more non-visible illuminators is a single non-visible illuminator; and
    the one or more image capture devices is an image capture device axially aligned with the single non-visible illuminator and another image capture device angularly separated with the single non-visible illuminator to provide a reliable and perceptible difference between the first state and the second state, the image capture device and the another image capture device configured to operate with non-visible filters,
    wherein the pupil images from the one or more image frames which represent the first state and the pupil images from the one or more image frames which represent the second state are nearly or substantially simultaneously captured by the image capture device and the another image capture device when the single non-visible illuminator is turned on.

2. The method of claim 1, wherein the non-visible illuminator is angularly separated with the another image capture device by at least 5°.

3. The method of claim 1, the method further comprising: determining whether the one or more eyes or the one or more pupils lie within a bounding box of the face.

4. The method of claim 1, the method further comprising: determining whether the face appears in a non-visible image frame from the one or more image frames.

5. The method of claim 1, the method further comprising:
determining whether a non-visible face appears in a position consistent with the one or more image capture devices.

6. The method of claim 1, the method further comprising:
determining whether a visible face appears in a position consistent with the one or more image capture devices.

7. The method of claim 6, wherein the one or more image frames is one or more non-visible image frames and one or more visible image frames.

8. The method of claim 7, wherein the one or more non-visible frames are near-infrared image frames.

9. The method of claim 7, wherein the one or more non-visible frames are infrared image frames.

10. The method of claim 1, the method further comprising:
storing collected biometric information for forensic analysis.

11. The method of claim 1, wherein information associated with the determined one or more eye(s) and the determined face are exchanged to assist in the determining of the face and the one or more eyes, respectively.

12. The method of claim 1, wherein the first state is one of dark pupil state or bright pupil state and the second state is a remaining one of the dark pupil state or the bright pupil state.

13. A biometric recognition device comprising:
at least one non-visible illuminator;
at least one image capture device in a differential measurement configuration with the at least one non-visible illuminator, the at least one image capture device configured to capture one or more images of at least a facial portion of a user; and
a processor connected to the at least one image capture device and the at least one non-visible illuminator, the processor configured to:
determine one or more eye(s) and a face from the one or more images;
perform liveness detection by comparing one or more pupil images from even-odd image pairs from the one or more images, wherein a non-noise color or brightness difference indicates pupil liveness or a live face;
perform face encoding on the live face to generate a face template;
perform face matching on the face template to generate a face result; and
use one or more of the liveness result and the face result to enable the user to access an object,
wherein for the differential measurement configuration:
the at least one non-visible illuminator is a single non-visible illuminator; and
the at least one image capture device is an image capture device axially aligned with the single non-visible illuminator and another image capture device angularly separated with the non-visible illuminator to provide a reliable and perceptible difference between the one or more pupil images from the even-odd image pairs, the image capture device and the another image capture device configured to operate with non-visible filters,
wherein the one or more pupil images from the even-odd image pairs are nearly or substantially simultaneously captured by the image capture device and the another image capture device when the non-visible illuminator is turned on.

* * * * *